United States Patent
Lanfant et al.

(10) Patent No.: US 12,337,556 B2
(45) Date of Patent: Jun. 24, 2025

(54) METHOD FOR MANUFACTURING A COMPOSITE MATERIAL PART HAVING A CELLULAR STRUCTURE AND CORRESPONDING PART

(71) Applicant: SAFRAN, Paris (FR)

(72) Inventors: Nicolas Pierre Lanfant, Moissy-Cramayel (FR); Patrick Dunleavy, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/245,199

(22) PCT Filed: Sep. 9, 2021

(86) PCT No.: PCT/FR2021/051544
§ 371 (c)(1),
(2) Date: Mar. 14, 2023

(87) PCT Pub. No.: WO2022/058673
PCT Pub. Date: Mar. 24, 2022

(65) Prior Publication Data
US 2023/0364868 A1    Nov. 16, 2023

(30) Foreign Application Priority Data
Sep. 17, 2020 (FR) ...................... 2009424

(51) Int. Cl.
*B29C 70/70* (2006.01)
*B29C 70/22* (2006.01)
(Continued)

(52) U.S. Cl.
CPC ............ *B29C 70/70* (2013.01); *B29C 70/222* (2013.01); *B29C 70/462* (2013.01); *F02K 1/54* (2013.01);
(Continued)

(58) Field of Classification Search
CPC ..... F02K 1/54; F02K 1/70; F02K 1/72; F05D 2300/603; B29C 70/70; B29C 70/222; B29C 70/462; B29L 2031/7504
See application file for complete search history.

(56) References Cited

U.S. PATENT DOCUMENTS 3,676,258 A       7/1972   Jackson
2005/0258575 A1*  11/2005  Kruse .................... B29C 70/32
                                                         264/573
(Continued)

FOREIGN PATENT DOCUMENTS

DE    10 2013 226 017 A1    6/2015
EP     0 244 120 A2        11/1987
(Continued)

OTHER PUBLICATIONS

International Search Report mailed Jan. 12, 2022, issued in corresponding International Application No. PCT/FR2021/051544, filed Sep. 9, 2021, 7 pages.
(Continued)

*Primary Examiner* — Andrew H Nguyen
(74) *Attorney, Agent, or Firm* — CHRISTENSEN O'CONNOR JOHNSON KINDNESS PLLC

(57) ABSTRACT

A method for manufacturing a composite material part having a cellular structure that includes at least one cell delimited by walls. The method includes supplying at least a first core, providing a web of a first fibrous reinforcement comprising a plurality of long discontinuous fibers randomly distributed in a plane, and producing at least one strip of the first fibrous reinforcement. The method further includes producing a second fibrous reinforcement in the shape of a sock, inserting the first core into the sock, draping the strip
(Continued)

around the sock containing the first core, placing the sock containing the first core and the wrapped strip in a mold, and thermocompression.

14 Claims, 5 Drawing Sheets

(51) Int. Cl.
    *B29C 70/46*     (2006.01)
    *B29K 105/08*     (2006.01)
    *F02K 1/54*     (2006.01)
    *B29L 31/00*     (2006.01)

(52) U.S. Cl.
    CPC ............ *B29K 2105/0827* (2013.01); *B29L 2031/7504* (2013.01); *F05D 2230/20* (2013.01); *F05D 2300/603* (2013.01)

(56) References Cited

U.S. PATENT DOCUMENTS

| 2016/0047333 A1* | 2/2016 | Starovic | F02K 1/70 |
| | | | 239/265.19 |
| 2016/0201480 A1* | 7/2016 | Foster | B29D 99/0028 |
| | | | 415/200 |

FOREIGN PATENT DOCUMENTS

| EP | 2 944 452 A2 | 11/2015 |
| JP | H06129302 A | 5/1994 |
| WO | 2013/128272 A1 | 9/2013 |

OTHER PUBLICATIONS

Written Opinion mailed Jan. 12, 2022, issued in corresponding International Application No. PCT/FR2021/051544, filed Sep. 9, 2021, 7 pages.

* cited by examiner

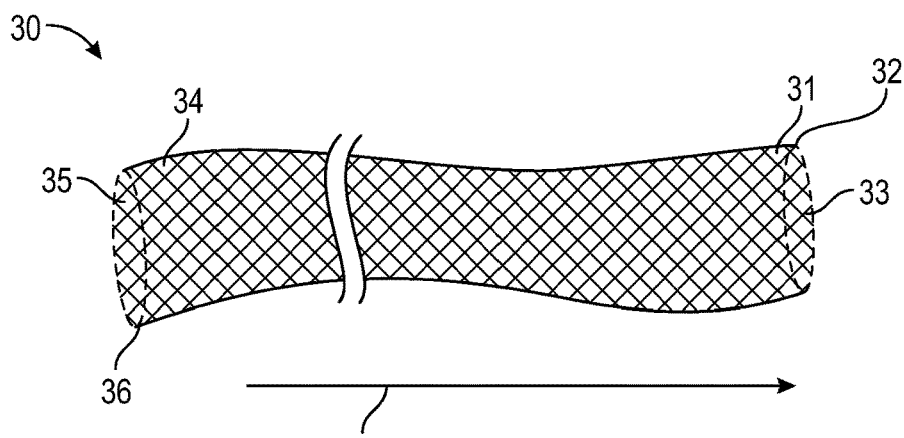
FIG. 6
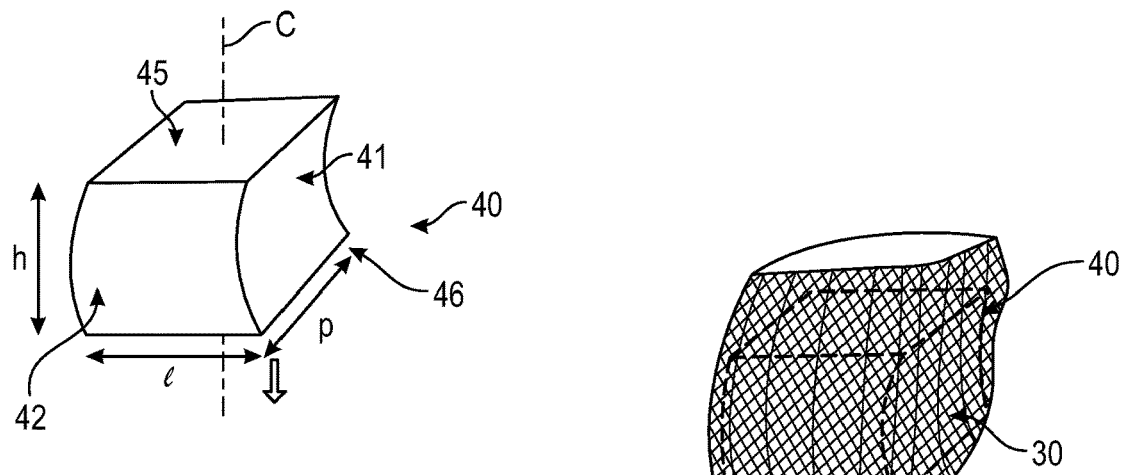
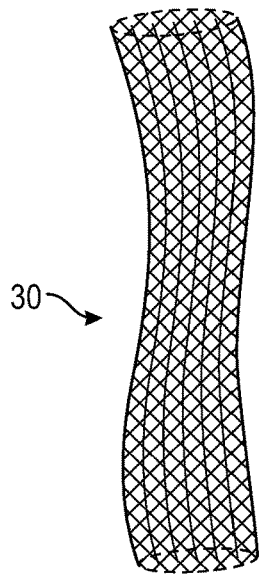
FIG. 7
FIG. 8

METHOD FOR MANUFACTURING A COMPOSITE MATERIAL PART HAVING A CELLULAR STRUCTURE AND CORRESPONDING PART

FIELD OF THE DISCLOSURE

The present disclosure relates to the field of parts made of composite material from a fibrous reinforcement densified by a matrix, in particular turbomachine parts. It is aimed in particular at the parts comprising a cellular structure.

BACKGROUND

It is known that various turbomachine parts, in particular aircraft turbomachine parts, can be made of a composite material in order to improve their thermomechanical resistance capacities and reduce their mass.

Some composite materials are usually composed of a fibrous reinforcement and a matrix. Examples of parts made of composite material are described in the documents US-A1-2005/258575, DE-A1-102013226017, U.S. Pat. No. 3,676,258, EP-A-244120 and EP-A1-2819838.

The cellular structures can constitute separate parts such as thrust reverser grids or stationary blading wheels. They can also be used in the manufacture of a part to constitute, for example, acoustic functions such as acoustic panels, thrust reverser flaps, etc. or mechanical functions such as self-stiffening panels. An example of a thrust reverser is described in the document EP-A2-2944452.

Several technologies have been identified for manufacturing parts made of composite material, including RTM (Resin Transfer Molding), thermoplastic injection and thermocompression. The RTM injection requires a fibrous reinforcement with in most cases continuous fibers. This technique requires a manual work and is best suited to medium-sized production runs. The thermoplastic injection of a fibrous reinforcement with long or short fibers (fibers in the resin and empty mold beforehand) allow to manufacture parts very quickly and at a high rate of output. However, in the scope of the cellular structures, the mechanical performance of the final parts obtained is limited. The manufacture of cellular structures using this technique creates a difficulty in managing the recollement lines (junction of the material flows that meet). It can be considered for lightly loaded applications. Thermocompression molding allow to densify a fibrous reinforcement already pre-impregnated with a matrix by applying a pressure and carrying out a thermal treatment at high temperature. In the case of a fibrous reinforcement of the laminated preform type (stacking of plies according to a determined sequence) made up of continuous fibers, the thermocompression is limited by the shape of the parts and it is necessary to drape each cell individually, which is time-consuming and costly. In the case of a discontinuous long fiber lap in combination with thermocompression, significant manufacturing cost savings and the manufacture of more complex shapes can be achieved. However, this technique implies a greater variability in material properties, in particular in the case of the low thickness laps. In particular, the material properties drop with a discontinuous long fiber lap thickness of less than 2.3 mm. Finally, depending on the draping strategy, problems of pull-out or delamination may occur at the level of the junctions of the cell walls, which may weaken the mechanical strength of the final part.

SUMMARY

The objective of the present disclosure is to provide a solution allowing for improving the manufacturing method of a part, in particular of a turbomachine, made of composite material with a cellular structure whose thickness of the walls is low while having the best aerodynamic and mechanical performances.

This is achieved in accordance with the disclosure by means of a method for manufacturing a composite material part comprising a cellular structure, in particular of a turbomachine, the cellular structure comprising at least one cell delimited by walls, the method comprising the following steps:

a step of supplying at least one first core,
a step of providing a lap of a first fibrous reinforcement comprising a plurality of discontinuous long fibers randomly distributed in a plane,
a step of producing at least one strip of the first fibrous reinforcement,
a step of producing a second fibrous reinforcement in the form of a continuous braided sock obtained by braiding,
a step of inserting the first core into the braided sock,
a step of draping the strip of the first fibrous reinforcement around the sock containing the first core,
a step of placing the assembly formed by the sock containing the first core and the strip draped around the sock, in a mold, and
a step of thermocompression of the assembly installed in the mold.

Thus, this solution allows to achieve the above-mentioned objective. In particular, with such a continuous hollow braided sock, it is sufficient to pass a core with the shape of the part to be produced. The braided sock provides a continuity of fibers on the walls of the cell, which will then be very fine (of the order of a millimeter, which is not negligible in the aeronautical field, for example) because of the braiding of the sock. The combination of a braided sock and the strip of a discontinuous long fiber lap allows to reduce the dispersion of the mechanical properties. Such a combination also allows for a continuity of the fibers at the level of the junctions of the walls of a cell and even of an adjacent cell. This improves the pull-out strength (mechanical performance) and improves the stiffness of the junction, which reduces the vibrations and therefore improves the aerodynamic performances. In addition, the method is simple and economical, as it allows to avoid the need for extensive handling of plies on a support mandrel, for example.

The method also comprises one or more of the following characteristics and/or steps, taken alone or in combination:
the second fibrous reinforcement of the sock is constituted of continuous long fibers.
the method comprises a cutting step in which the sock is cut so as to form a first sock segment having a length corresponding to a height of the first core.
the fibers of the strip and of the sock are pre-impregnated.
each assembly is placed in the mold in a row.
the step of placing in the mold comprises a sub-step of placing a ply between each row.
the method comprises a step of partial polymerization of the assembly formed by the sock containing the first core and the strip draped around the sock, the partial polymerization step being carried out before the polymerization step or before the step of placing in the mold.
at least one second core is inserted into the same sock which is cut into a second sock segment and at least one strip is draped around the second sock segment, and in that the assembly formed by the second sock segment around the second core and the band draped around the sock is placed in the mold.

the method comprises placing at least one third sock segment around at least two assemblies of cores each contained in a sock segment which are draped with at least one strip, the two assemblies being juxtaposed.

several strips of the lap are draped around the sock segment containing the core.

the sock is obtained by biaxial or triaxial braiding.

the first and/or the second core or cores is or are fusible.

the method comprises the provision of a mold.

the fibers of the ply are pre-impregnated.

the method comprises a step of pre-impregnating the fibers of the fiber reinforcement or reinforcements.

the pre-impregnation step is carried out prior to the partial polymerization step.

The disclosure also relates to a turbomachine part made of composite material comprising at least one fibrous reinforcement densified by a matrix, the turbomachine part being produced by the method having any of the preceding characteristics and comprising a cellular structure with at least one cell delimited and separated by walls.

The turbomachine part may be a thrust reverser grid or a thrust reverser flap. The part may also be a pair of vanes connected by a radially internal platform and a radially external platform, the cell separating the pair of vanes in a circumferential direction, a multiplet comprising at least three vanes spaced apart by cells or a turbomachine wheel.

The disclosure further relates to a turbomachine comprising a composite material part as mentioned above.

DESCRIPTION OF THE DRAWINGS

The disclosure will be better understood, and other purposes, details, characteristics and advantages thereof will become clearer upon reading the following detailed explanatory description of embodiments of the disclosure given as purely illustrative and non-limiting examples, with reference to the appended schematic drawings in which:

FIG. 6 is a schematic and perspective view of an example of a fibrous reinforcement in the form of a continuous hollow sock according to the disclosure;

FIG. 7 is a schematic and perspective view of a core and a sock according to the disclosure;

FIG. 8 is a schematic and perspective view of a sock segment surrounding the surfaces of a core according to the disclosure;

DETAILED DESCRIPTION

Figure 1:
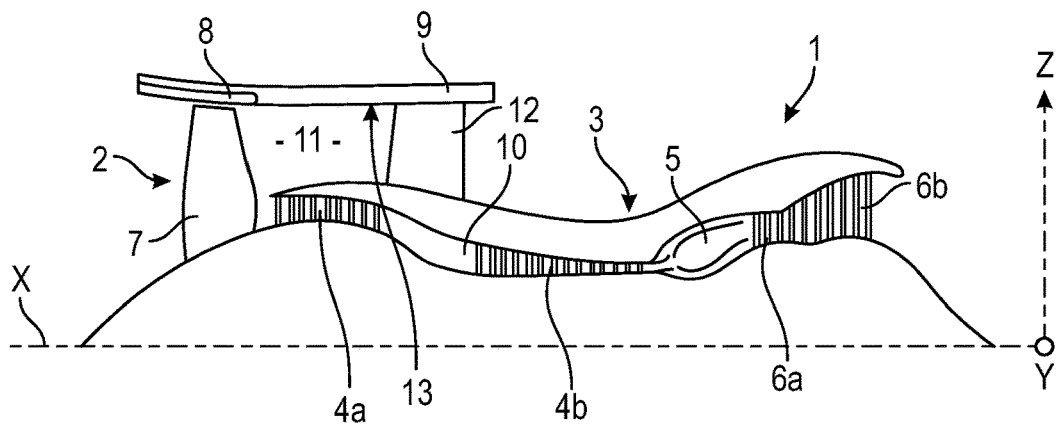
FIG. 1 is a partial and axial sectional view of an example of a turbomachine to which the disclosure applies.

FIG. 1 shows an axial and partial cross-section of a turbomachine 1 of longitudinal axis X which comprises various parts and/or members that can be made of composite materials. Of course, the disclosure is generally applicable to all parts made of composite material with complex shapes (e.g. profiles with changing cross-sections) and in various fields in which the parts allow a transmission of the forces and a mass reduction while being economical.

The turbomachine 1 in FIG. 1 is a dual-flow and dual-body turbomachine intended for mounting on an aircraft. The turbomachine 1 comprises a fan 2 which is mounted upstream of a gas generator 3 or engine along the flow of the gases in the turbomachine and here along the longitudinal axis X (and even from left to right in FIG. 1). The gas generator 3 comprises, from upstream to downstream, a low-pressure compressor 4a, a high-pressure compressor 4b, a combustion chamber 5, a high-pressure turbine 6a and a low-pressure turbine 6b. The fan 2 comprises a plurality of fan vanes 7 which extend along a radial axis Z and whose free ends are surrounded by a fan casing 8. The longitudinal axis X is perpendicular to the radial axis Z and also to a transverse axis Y. The fan casing 8 is carried by a nacelle 9, the nacelle 9 and the fan casing 8 being centered on the longitudinal axis X. The fan 2 divides the air entering the turbomachine into a primary airflow which passes through the gas generator and in particular into a primary duct 10, and a secondary airflow which flows around the gas generator in a secondary duct 11. Outlet Guide Vane (OGV) 12 which are downstream of the fan vanes 7, extending around the longitudinal axis X and across the secondary duct to straighten the secondary airflow.

Figure 2:
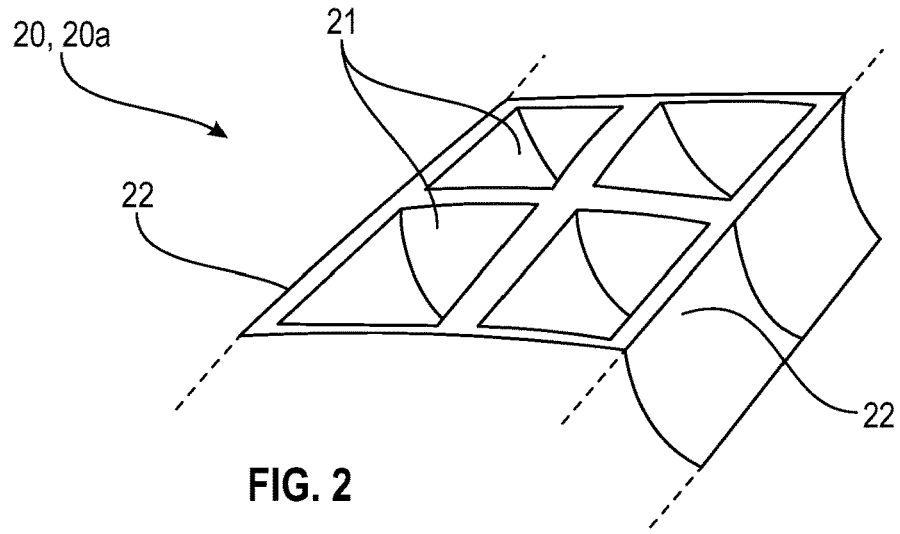
FIG. 2 is a schematic and perspective view of an example of a composite material part with a cellular structure according to the disclosure.
Figure 3:
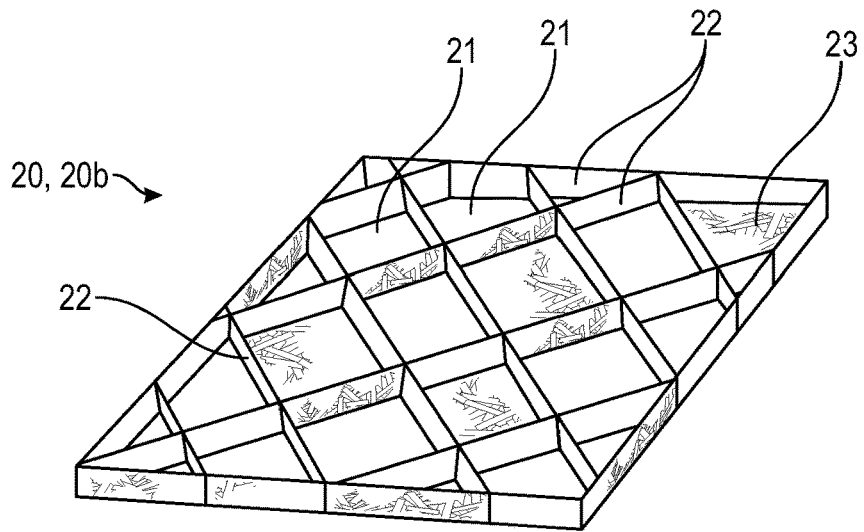
FIG. 3 is a schematic and perspective view of another example of a composite material part with a cellular structure and a bottom according to the disclosure.

FIGS. 2 and 3 each illustrate a part 20 made of composite material with a fibrous reinforcement embedded in a matrix. In particular, the part 20 comprises a cellular structure. Each cell 21a, 21b is delimited by several walls 22 forming a parallelepiped. However, the cells 21a, 21b may have cross-sections with other shapes such as hexagonal, circular, triangular. As can be seen in FIG. 2, the walls also allow to separate the cells from each other. The cellular structure here forms a honeycomb structure (NIDA). The part 20 of FIG. 2, made of a composite material with a cellular structure, allow to produce thrust reverser grids 20a which are intended to be installed in a fan casing, for example. The part 20 comprises a panel 23 forming a bottom from which the walls 22 of the cellular structure rise. This type of part 20 allow advantageously to produce thrust reverser flaps or acoustic panels 20b. The latter are typically arranged on a radially internal wall 13 of the fan casing 8 and downstream of the fan vanes 7 along the longitudinal axis.

The part made of composite material with a cellular structure as above is composed of a first fibrous reinforcement with discontinuous long fibers and a second fibrous reinforcement with continuous long fibers. The fibrous reinforcements are intended to provide strength to the final part 20 obtained in particular at the level of the walls or junctions of the part. The cells of the part are obtained by removable cores around which the fibrous reinforcements are placed. The fibrous reinforcements are densified by a matrix to obtain the final rigid part with the cells (whose respective shapes are obtained by the cores).

Figure 13:
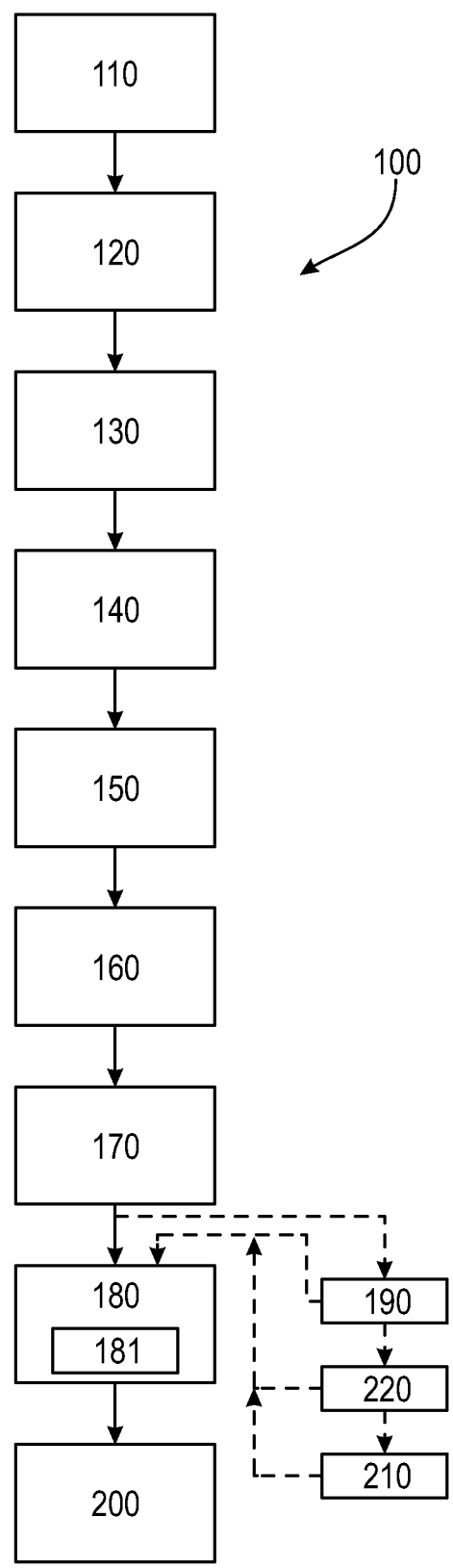
FIG. 13 shows a flow chart of a method for manufacturing a composite material part according to the disclosure.

We will now describe in detail the manufacturing method 100 of such a cellular part. This method is shown in FIG. 13. With reference to FIGS. 7 and 8, the method 100 comprises a step 110 of supplying or providing at least one first core 40 having a shape corresponding to that of the cell 21 of the cellular structure of the final part 20, 20a, 20b. In the present example, the core 40 has a generally cubic shape with a height h, depth p and width l. The core 40 has external draping surfaces 41, 42.

Figure 4:
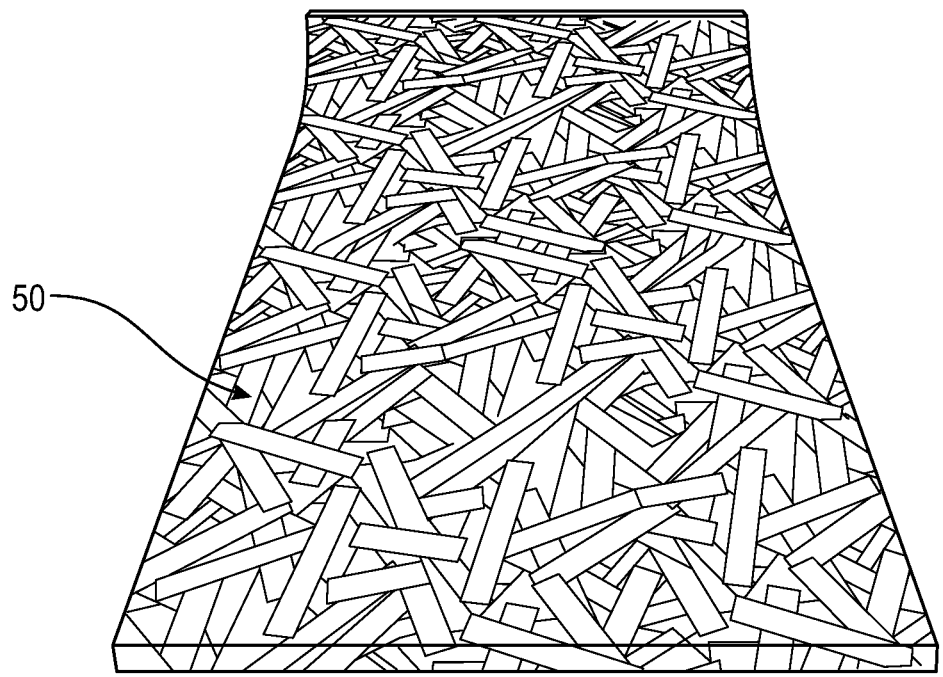
FIG. 4 shows a perspective view of a DLF lap of a first fibrous reinforcement according to the disclosure.

The method 100 comprises a step 120 of providing a lap 50 of the first fibrous reinforcement as shown in FIG. 4. The lap 50 comprises a plurality of discontinuous long fibers which are randomly oriented in all directions in a plane. The discontinuous long fibers are known by the acronym "DLF" (Discontinuous Long Fiber). In particular, the DLF lap 50 comprises the fibers and a matrix. In particular, the fibers are pre-impregnated.

The DLF lap 50 itself is manufactured from a number of "chips" or coupons comprising oriented fibers. More specifically, the manufacture of the DLF lap 50 comprises cutting a number of coupons from an original lap which comprises unidirectional fibers impregnated with a matrix. Each coupon (of unidirectional pre-impregnated fibers) is approximately 50 mm long and 10 mm wide. Each coupon is also approximately 0.15 mm thick. The manufacture of the DLF lap 50 also comprises the random layering of several coupons. This implies that the fibers of the DLF lap 50 are also randomly (and in all directions) oriented in the plane. The DLF lap is considered isotropic in the plane (same mechanical properties in all directions in the plane of the DLF lap) and is assimilated to an orthotropic material (three planes of orthogonal symmetry).

Figure 5:
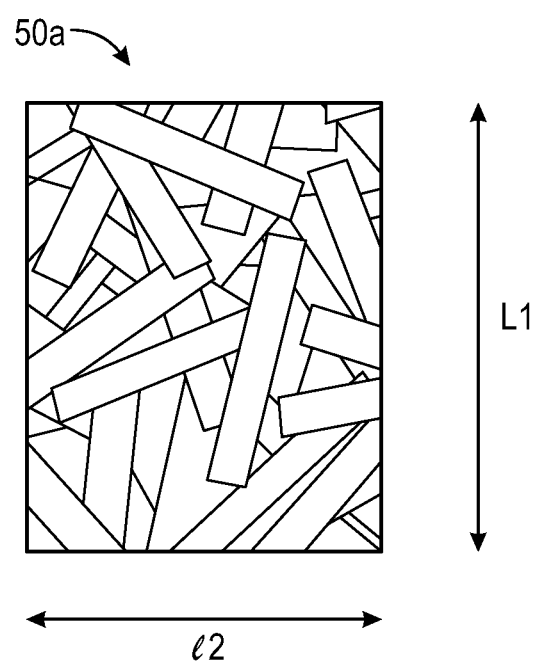
FIG. 5 shows an example of a strip cut from the DLF lap of the previous FIG. according to the disclosure.

The manufacturing method 100 of the part comprises a step 130 of producing at least one strip 50a of the DLF lap 50, hereinafter referred to as DLF strip 50a. An example of a DLF strip 50a is shown in FIG. 5. In particular, this step comprises cutting the DLF lap 50 to make one or more DLF strips 50a. In other words, the fibers of the strips 50a of the first reinforcement are pre-impregnated and comprise fibers oriented in all directions in a same plane. Each DLF strip 50a comprises, for example, a length L1 of approximately 100 mm and a width l2 of approximately 50 mm. These dimensions can be applied to the manufacture of a thrust reverser grid. Of course, the size of the DLF strips depends on the draping and/or the part to be manufactured. Each DLF strip has a thickness corresponding to the thickness of several pre-impregnated plies. The number of plies can be equal to about ten plies. The discontinuous long fibers are between 10 and 60 mm long.

The fibers are advantageously pre-impregnated with a polymeric impregnation matrix. The latter comprises in particular a thermoplastic or thermosetting resin. An example of a thermoplastic resin is a polyamide, polyetheretherketone, polyetherketoneketone, polyphenylene sulfide or polyaryl etherketone. The thermosetting resin comprises, for example, an epoxide or a polyimide. The fibers are mineral, metallic, thermoplastic polymer or thermosetting polymer fibers or a mixture of these fibers. An example of fiber is carbon, glass or aramid fiber.

Preferably, but not restrictively, the DLF lap 50 is of the type marketed under the name HEXMC®. The matrix or resin can be an epoxy resin such as 8552® and the fibers are carbon.

With reference to FIG. 6, the method comprises a step 140 of making the second fibrous reinforcement in the form of a sock 30, a hose, or else an envelope. The sock 30 is hollow or tubular and continuous. In the present example, the fibrous reinforcement of the sock 30 is obtained by braiding along a longitudinal direction L (direction of advance of the braid) so as to provide dimensional stability of the fibrous reinforcement in terms of its thickness and length along the longitudinal direction. The sock 30 comprises a first end 31 which is open. The first end 31 comprises a first border 32 which delimits a first aperture 33 opening into the interior of the hollow sock 30. The sock 30 also comprises a second end 34 (opposite the first end 31) along the longitudinal direction L) which also comprises a second aperture 35 delimited by a second border 36.

The threads or strands used to produce the sock 30 comprise mineral, metallic, thermoplastic polymer or thermosetting polymer fibers or a mixture of these fibers. As mineral fibers we have carbon, glass, ceramic, silica, silicon carbide. Thermoplastic or thermosetting polymer fibers can be made of aramid, polyamide or alumina. The metal fibers may comprise steel, titanium, INCONEL®, bronze or else copper.

Advantageously, the second fibrous reinforcement of the sock 30 consists of continuous long fibers.

Advantageously, the braiding of the fibrous reinforcement (forming the sock) is a triaxial or biaxial type braiding. A triaxial braiding allows the braid to have a perimeter that does not deform when it is pulled or, conversely, to have a constant height when the perimeter is compressed. This is because it provides stiffness in the longitudinal direction of the braid, which corresponds to the braiding direction. In triaxial braiding, the fibers extend in the preform in three directions, a first direction parallel to the longitudinal direction (forming an angle of) 0° and a second and third direction each forming an angle of between 0° and 90° to the longitudinal direction. The biaxial braiding allows to facilitate the deformation prior to the densification with a matrix.

With reference to FIGS. 7 and 8, the method comprises a step 150 of inserting the first core 40 into (inside) the braided sock 30. After insertion, the fibers of the sock 30 are applied to four draping surfaces 41, 42 of the core which are juxtaposed around a central axis C of the core 40 as shown in FIG. 7. The core 40 comprises faces 45, 46 which are opposite each other along the axis C (and here along the longitudinal direction L of the sock 30 with reference to FIG. 6). In particular, each face 45, 46 is defined in a plane perpendicular to the plane of the draping surfaces 41, 42. Once the core 40 is inserted into the sock 30, the faces 45, 46 are not covered by the sock 30.

Figure 9:
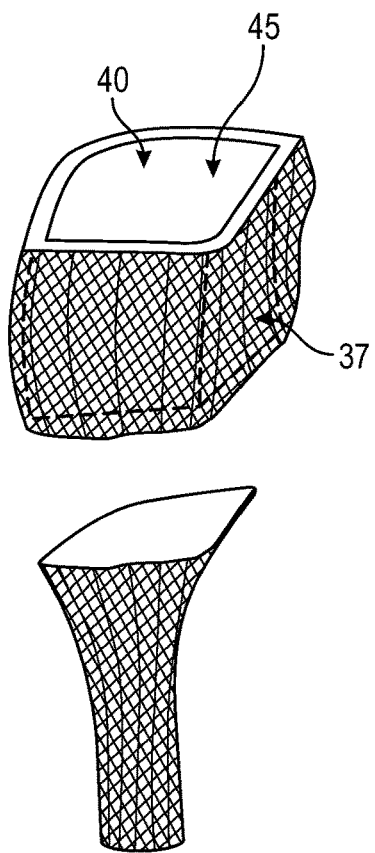
FIG. 9 is a schematic and perspective view of the core inserted in the continuous hollow sock according to FIG. 8 and the rest of the cut sock according to the disclosure.

With reference to FIG. 9, the method comprises a step 160 of cutting the sock 30 so as to form a first sock segment 37 having a predetermined length corresponding to the height h of the core. Similarly, the length of the cut sock corresponds substantially to the height of the wall of the cellular structure of the final part.

The method comprises a step 170 of draping at least one DLF strip 50a of the first fibrous reinforcement over (around) the sock 30. The DLF strip 50a is arranged so as to produce the walls or junctions that separate the cells from the final part. Several DLF strips are arranged and/or stacked around the sock (opposite the draping surfaces) and overlap all or part of the draping surfaces 41, 42. Alternatively, a single and unique DLF strip 50a surrounds the sock segment 37.

Figure 10:
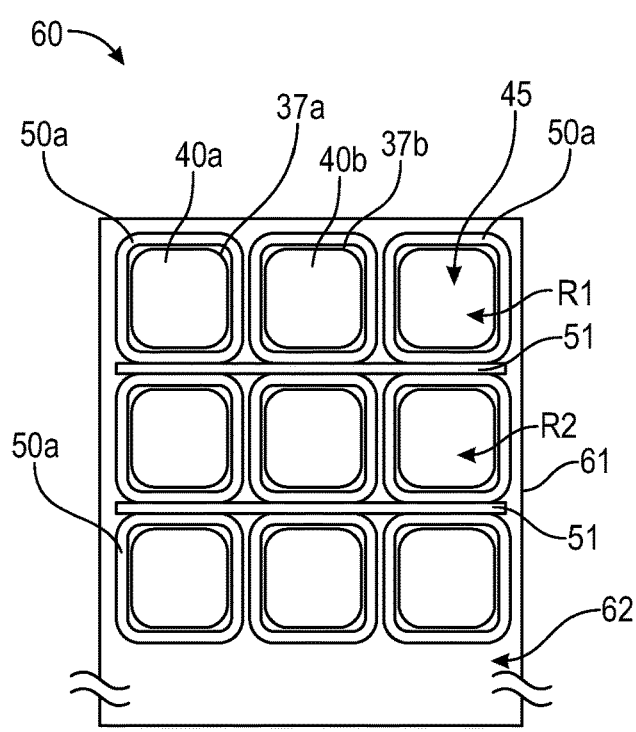
FIG. 10 is a schematic and top view of a mold in which are placed cores surrounded respectively by sock segment and at least one DLF strip surrounding each sock segment according to the disclosure.

The assembly (first assembly) "first sock segment 37 (cut out) containing the first core 40a and a strip 50a draped around the sock 30" is placed (step 180) in a mold 60, which is shown in FIG. 10. The mold 60 comprises lateral panels 61 which rise from a bottom wall 62. The assembly is installed so that the undraped face 45 of the core turned outwards from the mold 60 (or opposite and spaced from the bottom wall 62 of the mold 60).

These last steps are repeated several times with the same continuous hose sock. That is, a second core 40b is inserted into the same sock 30 which is cut to form a second sock segment 37b (see FIG. 10) at the height of the second core 40b. Then one or more DLF strips 50a are draped over the second sock segment 37b, and this assembly (second assembly) is then placed in the mold 60. The second assembly is arranged next to the first assembly in a first row R1. These operations are repeated until the surface of the mold is filled, row after row.

Alternatively, as shown in FIG. 10, the step 180 may comprise a sub-step 181 of placing a ply 51 (or other fibrous reinforcement) between each row R1, R2 of cores, socks, DLF strip or strips assembly. The ply 51 is arranged after each row R1, R2 has been completed. In other words, two rows are separated in a direction parallel to the bottom wall 62 (and/or perpendicular to the ply direction) by a ply 51. Advantageously, the unidirectional ply is in the form of a rectangular plate or a stacking of plies that forms a plate. The ply 51 has a thickness, a length and a width. The thickness is between 0.010 mm and 10 mm. The length and the width depend on the dimensions of the final part. Each ply 51 may consist of a unidirectional lap in which the fibers are parallel to each other. The ply 51 can also be made from a DLF strip or be woven. Advantageously, the fibers of the ply 50 are pre-impregnated. Such a ply is used, for example, in the scope of the manufacture of a thrust reverser grid.

In the scope of producing the part 20b, the method 100 may comprise, prior to the step 180, a step 190 of arranging a layer of a third fibrous reinforcement on the bottom wall 62 of the mold 60. This third fibrous reinforcement may be a segment of the DLF lap or a continuous long fiber laminate. The various assemblies are placed in the mold on this third reinforcement layer.

The method further comprises a step 200 of polymerizing the preform so as to densify the fibrous reinforcements. Advantageously, the polymerization is a thermocompression. The thermocompression is the application of a predetermined pressure and temperature cycle. The mold 60 is installed in an oven which will be heated. In particular, the polymerization temperature is between 150° C. and 400° C. The temperature can be stationary or variable during the cycle. During the polymerization, the pressure applied is between 0.1 and 200 bar. In the case of thermocompression, a force is exerted, for example, on the surface of the sock or by the outer surfaces of the mold. The pressure is applied to the surfaces/faces of each core (in each sock segment) in at least two directions. Advantageously, the pressure is applied in several directions. The pressure can be produced by means of pistons. In the case of a sock produced by triaxial braiding, the height of the sock does not change and the perimeter of the sock is fixed after the polymerization.

Advantageously, each sock, core, DLF strip or strips assembly may undergo a partial polymerization or pre-cure step 210. This is a first thermal treatment that starts the polymerization of the resin or matrix to adapt the minimum viscosity and avoid that the resin is too fluid when pressure is applied while still being malleable. We understand that this step takes place before the polymerization step 200. Advantageously, this step 210 is carried out before the step 180 of placing in the mold. Such partial polymerization allows to prevent the migration of too much resin through the sock and the DLF strips. Also, if the resin is too fluid, the resin can flow faster than the fibers, which can cause the resin to be ejected. In this way, the uniform migration of the resin during this partial polymerization step is controlled and allows the reduction of the porosity areas so as to achieve the expected mechanical performance.

A partial polymerization step 210 may take place for the ply 51 before the polymerization step 200. Advantageously, this step 210 is carried out before the ply 51 is placed in the mold 60.

Similarly, in the step 210, the resin is heated to a temperature of between 50° and 150° C. and for a period of between 1 min and 60 min. This temperature depends on the nature of the impregnating resin. The partial polymerization rate of the impregnating resin is preferably between 10% and 60%. At the end of this step, the sock or socks 30 and the DLF strip or strips 50a are relatively stiff, dry and not sticky.

The solidified part after polymerization (step 200) is then unmolded. In the present example, in order to facilitate demolding, each core 40, 40a, 40b is made of a meltable material such as salt or a eutectic material. Other examples of fusible materials are of course possible. Alternatively, each core 40, 40a, 40b consists of several blocks to facilitate subsequent demolding. In other words, each core is rigid.

With reference to FIGS. 2 and 3, the final part, in this case a cellular structure, is a monobloc part (made integral) whose walls 22 delimiting the cells (voids) are formed of several fibrous reinforcements densified by a matrix.

Figure 11:
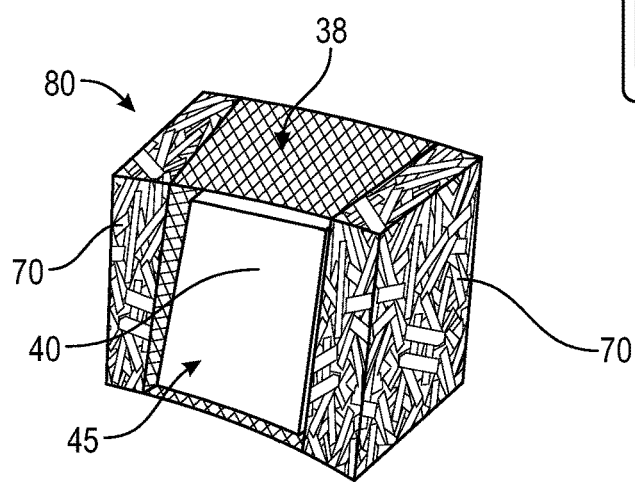
FIG. 11 is a schematic and perspective view of a blank example of a pair of straighteners in which the cell separating the vanes is at least obtained by using at least one sock containing a core and DLF strips according to the disclosure.

FIG. 11 illustrates a blank 80 of a segment of a turbomachine wheel (not shown). This blank 80 is intended to form a doublet with a pair of vanes of a turbomachine which are spaced apart by a cell 21 in a circumferential direction. The doublet is manufactured integral and in one-piece. The vanes may be vanes OGV, as described above, arranged downstream of the fan or straightener vanes (IGV for Inlet Guide Vane) arranged at the inlet to the primary duct. Each vane comprises a blade, a radially external platform at the head of the blade and a radially internal platform at the root of the blade. Each vane is made of a fibrous reinforcement. The cell is made in the same way as described above.

In particular, the cell is made by means of a core 40 which is inserted (step 150) into a sock 30 which will be cut (step 160) into a sock segment 38 at the height of the core. The braiding of the sock could be carried out directly on the core which would act as a support mandrel. The sock segment 38 will allow to at least partly delimit the intrados and extrados surfaces of each blade, which are connected upstream by the leading edge and downstream by the trailing edge for each blade. Each blade is made from one or more DLF strips 50a to form a preform 70 of vane blade. To this end, one or more DLF strips 50a are then draped (step 170) around the sock segment containing the core, and in particular on either side of the core (in a direction perpendicular to the face 45). This assembly is then placed (step 180) in the mold 60. The face 45 of the core is arranged so as to be substantially parallel to the bottom wall 62 of the mold. A polymerization (thermocompression) step 200 is performed to densify the assembly (which is placed in the mold as described above). As in the previous embodiments, a partial polymerization step 210 may be carried out prior to the polymerization step. These steps are repeated several times for each pair of vanes spaced by one cell to form a complete wheel.

Figure 12:
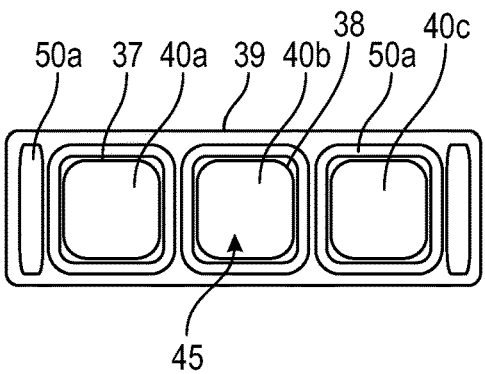
FIG. 12 is a schematic and top view of an example of a blank for producing a one-piece composite material turbomachine wheel multiplet or sector according to the disclosure.

The method can also allow to manufacture the complete (360°) turbomachine wheel, a multiplet or a sector of a turbomachine wheel. The multiplet or wheel sector comprises at least three vanes (OGV or IGV) spaced by at least two cells. As with the doublet, the multiplet is made integral and in one-piece. To manufacture this multiplet or sector, the same steps described in connection with FIGS. 10 and 11 are implemented. In particular, FIG. 12 shows three cores 40*a*, 40*b*, 40*c* and around the DLF strips 50*a* to form four blade preforms. The cores are respectively inserted into a sock 30 which is cut at the height of the core to form sock segments. One or more DLF laps 50*a* are draped around the sock segments containing the core to form the preforms of the blades of the vanes. In the scope of the multiplet or sector, the method comprises a step 220 of placing the or a sock 30 around the assemblies here comprising three cores each surrounded by a sock segment and DLF strips. The assemblies are juxtaposed substantially in a row with the face 45 turned outwards. The or the other sock will be cut into a (third) sock segment 39 at a height corresponding to the chord of the blade or height of the cores. In this way, the cut sock segment 39 is arranged at the radially lower and upper portion of the preforms (along a direction perpendicular to the face 45 of the cores defined in a plane which is parallel to the bottom wall of the mold) to connect the four blade preforms and the three cores. A polymerization step 200 is performed to densify the assembly, possibly with a partial polymerization step beforehand.

The invention claimed is:

1. A method for manufacturing a part made of composite material comprising a cellular structure for a turbomachine, the cellular structure comprising at least one cell delimited by walls and the method comprising the steps of:
   supplying at least one first core,
   providing a lap of a first fibrous reinforcement comprising a plurality of discontinuous long fibers randomly distributed in a plane,
   producing at least one strip of the first fibrous reinforcement,
   producing a second fibrous reinforcement in a form of a continuous braided sock and obtained by braiding, the second fibrous reinforcement comprising continuous long fibers, inserting the at least one first core into the sock,
   draping the at least one strip of the first fibrous reinforcement around the sock containing the at least one first core,
   placing an assembly formed by the sock containing the at least one first core and the at least one strip draped around the sock in a mold,
   thermocompressing the assembly installed in the mold, and
   demolding of the thermocompressed assembly by removing the at least one first core and leaving the cell in place of the at least one first core.

2. The manufacturing method according to claim 1, further comprising a cutting step in which the sock is cut so as to form a first sock segment having a length corresponding to a height of the at least one first core.

3. The manufacturing method according to claim 2, wherein at least one second core is inserted into the same sock which is cut into a second sock segment and the at least one strip is draped around the second sock segment, and in that the assembly formed by the second sock segment around the at least one second core and the at least one strip draped around the sock is placed in the mold.

4. The manufacturing method according to claim 3, further comprising a step of placing at least one third sock segment around at least two assemblies of third cores, each contained in a respective sock segment, which are draped with the at least one strip, wherein the at least two assemblies are juxtaposed.

5. The manufacturing method according to claim 3, wherein at least one of the at least one first core and/or at least one of the at least one second core is fusible.

6. The manufacturing method according to claim 1, wherein the fibers of the at least one strip and the sock are pre-impregnated.

7. The manufacturing method according to claim 1, wherein each assembly is placed in the mold in the form of rows.

8. The manufacturing method according to claim 7, wherein the step of placing in the mold comprises a sub-step of placing a ply between each row.

9. The manufacturing method according to claim 1, further comprising a step of partial polymerization of the assembly formed by the sock containing the at least one first core and the at least one strip draped around the sock, the step of partial polymerization being carried out before the step of thermocompressing or before the step of placing in the mold.

10. The manufacturing method according to claim 1, wherein the sock is obtained by biaxial or triaxial braiding.

11. A turbomachine part made of composite material having a cellular structure comprising a cell delimited by walls, at least one of the walls including a fibrous reinforcement assembly densified by a matrix, the fibrous reinforcement assembly comprising:
   a first fibrous reinforcement in a form of a strip having randomly distributed discontinuous long fibers and, the strip surrounding an axis of the cell and having an interior face; and
   a second fibrous reinforcement of braided continuous long fibers, the second fibrous reinforcement being arranged inside of the first fibrous reinforcement and having an exterior face engaging the interior face of the first fibrous reinforcement,
   wherein the cell is one of a plurality of cells arranged in several rows, the rows being arranged in a first direction, a portion of the first fibrous reinforcement surrounding a first cell of the plurality of cells being adjacent to a portion of the first reinforcement surrounding a second cell of the plurality of cells arranged in the same row.

12. The turbomachine part according to claim 11, wherein the turbomachine part is a thrust reverser grid, a thrust reverser flap, a pair of vanes connected by a radially internal platform and by a radially external platform, the cell separating the pair of vanes in a circumferential direction, a multiplet comprising at least three vanes spaced apart by cells, or a turbomachine wheel.

13. The turbomachine part according to claim 11, wherein a portion of each first reinforcement is linked to a ply separating each row along the first direction.

14. The turbomachine according to claim 13, wherein the ply comprises a thickness between 0.010 mm and 10 mm.

* * * * *